June 26, 1934.  E. W. KAISER  1,964,123
PIPE OR LIKE DEVICE
Filed March 16, 1931
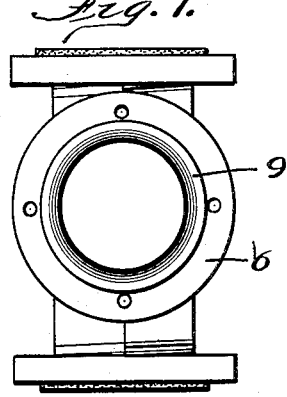
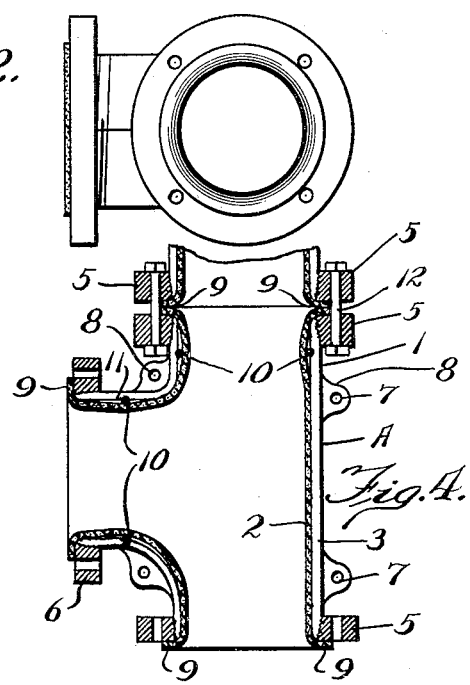
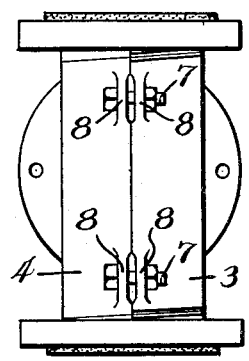
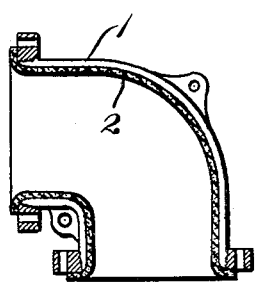
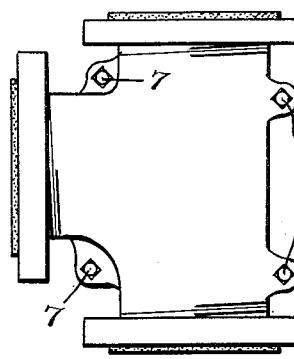
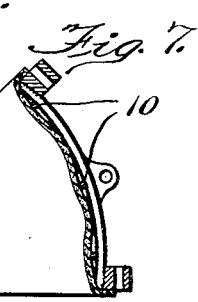
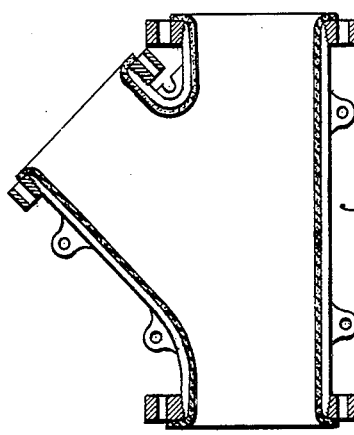
Inventor:
Edward W. Kaiser.
By H. Miller Belfield
Atty.

Patented June 26, 1934

1,964,123

UNITED STATES PATENT OFFICE 1,964,123

PIPE OR LIKE DEVICE

Edward W. Kaiser, Chicago, Ill.

Application March 16, 1931, Serial No. 523,130

2 Claims. (Cl. 137—75)

My invention relates to pipes or like devices.

My invention is concerned with pipes, and is adapted to produce a pipe adapted for use in plants and locations where the fumes of corrosive chemicals are in the air, and which will stand up under such fumes despite the fact that the exposed material is not per se a perfect resistant to the fumes.

In ordinary pipes, where liquids of a lower temperature than the atmosphere flow through them, the pipe is said to sweat, i. e., the moisture from the air surrounding the pipe is deposited on the colder surface thereof, leaving it moist, so that the fumes of the acid or other corrosive chemical are absorbed by the moisture, and are then certain to attack the metal of which it is composed, with the result that it is eventually eaten through or so weakened that it bursts under the internal pressure, which is sometimes very considerable. While a lead pipe resists the corrosive action of most chemicals, it lacks the rigidity, such as that of iron or steel, necessary to make a successful pipe unless it is of an impractical thickness. The patent to Smith No. 171,440, granted December 21, 1875, shows an attempt to give the desired rigidity by lining an iron or steel pipe with lead, but, in that patent, the lead lining is pressed against the iron or steel, so that the temperature of the liquid flowing through it is conducted directly to the surface, so that it sweats just the same as a solid pipe of either steel or iron.

By my invention I obviate this difficulty, by using a tubular lead lining and surrounding it by a casing of iron or any other desired rigid material, and spacing it away from the lining so far as practicable to produce a dead-air space between the lining and the casing so that the temperature of the liquid therein cannot be conducted to the outer casing, but it is insulated, so to speak, by the dead-air space between the casing and the lining.

To illustrate my invention, I annex hereto a sheet of drawings, in which the same reference characters are used to designate identical parts in all the figures, of which:

Fig. 1 is a side elevation of a pipe section embodying my present invention;

Fig. 2 is a top plan of the same;

Fig. 3 is a side elevation of the side opposite to that shown in Fig. 1;

Fig. 4 is a longitudinal section of the device, showing the end of another section fitted and secured to the first one;

Fig. 5 is a side elevation looking at the device as shown in Fig. 3 from the left; and Figs. 6, 7 and 8 are vertical sections of modified forms of construction.

Referring to the device shown in Figs. 1 to 5 inclusive I show a pipe or pipe section A comprising an outer shell or casing 1 and an inner shell or casing 2. The outer shell or casing 1 is preferably made of steel or similar material and is preferably made in two longitudinal halves 3 and 4. These halves are secured together by suitable fastening devices, such for example as the threaded collars 5 and 6, which are fitted over threaded ends of the two longitudinal halves when the same are placed together and are then turned so as to draw those halves firmly and tightly together, the ends of the halves being provided with slightly tapered threads and the internal threads on the collars 5 and 6 being also slightly tapered so as to secure a binding or tightening action as said collars 5 and 6 are screwed into position.

Bolts 7—7 are also preferably used to hold the longitudinal halves 3 and 4 together, said bolts passing through lugs or ears 8—8 on said longitudinal halves 3 and 4.

The inner casing or lining 2 is preferably made of thin or sheet metal of a flexible kind such for example as lead. This inner member 2 is preferably formed of one piece or made continuous, that is to say, it is not longitudinally split as the outer shell or casing is. Said member 2 fits with reasonable snugness or closeness to the interior of the outer member 1 and is shaped as that member is shaped. Said inner member 2, however, is made longer than the outer member 1 so that its ends project beyond the ends of the member 1 and these projecting ends are bent or turned over so as to cover or overlap the ends or end portions of the member 1, as well shown in Fig. 4, in which said overturned or overlapping ends are indicated at 9.

In assembling the device the outer and inner members 1 and 2 respectively are placed in proper relationship, with the ends of the inner member 2 projecting straight out beyond the ends of the outer member 1, and while in this condition the threaded collars 5 and 6 are put in position and screwed down and the bolts 7 are put in place and made tight, so that the outer member 1 tightly encloses the inner member 2. The projecting ends of the latter are then turned or bent over so as to overlap the end portions of the member 1 and the outer surfaces of the collars 5 and 6, as shown in Fig. 4. This makes the pipe or pipe section secure and tight and gives it its final desired form.

As a preferred arrangement in the pipe section shaped as illustrated in Figs. 1 to 5 inclusive, small washers or wires 10, 10 are preferably inserted in position between the outer and inner members 1 and 2. This makes small air spaces 11, 11 which prevent sweating on the outside of the device, due to the fact that the separation of the inner lining 2 from the outer shell or casing 1 prevents the outside of the pipe or pipe fitting from being appreciably affected by the temperature or other characteristics of the material in the pipe and thus sweating on the outside of the pipe is prevented.

In Fig. 4 two pipe sections are shown fitted end to end and secured to one another by bolts 12 passing through the threaded collars 5—5.

In Fig. 6 an elbow arrangement is shown and a slightly different elbow is shown in Fig. 7. These elbows of Figs. 6 and 7 are really continuous lengths of pipe and illustrate the way in which the invention is embodied in such lengths of pipe as compared with its embodiment in pipe fittings or joints, shown in the other figures. In Fig. 6 the inner lining 2 is shown fitting closely within the outer casing 1, but in Fig. 7 the preferred arrangement is shown which involves the intermediate or separating wires or washers 10, 10 for holding the inner lining spaced from the outer shell or casing so as to give an air space as above set forth. In Fig. 8 a pipe section with an angular lateral section or part is shown. This device of Fig. 8, like those of Figs. 6 and 7, embodies the principles of construction above set forth. In Fig. 8 the separating wires or washers 10 are omitted, but it will be understood that they may be used if desired.

Thus it will be seen that the pipe construction herein set forth has the advantages of a lead or similarly lined pipe without the disadvantages of lead or like lined pipes now on the market. Not only that, but it has certain advantages not possessed by other lead lined pipes so far as I am aware and does not have the disadvantages of the same.

For example, the pipe structure set forth may be made simply and economically by first constructing the outer shell or casing in parts and then placing those parts together over the previous and independently constructed interior or lining part and this is a much more advantageous construction than if the outer part as well as the inner part was made continuous and the inner part or lining cast into it. Furthermore, the pipe or pipe fitting herein set forth possesses lead or like ends flanged over the ends of the outer shell or casing so that an effective seal between adjacent pipe sections is secured. This advantage is not found in other lead lined pipes so far as I am aware and the advantage is substantial and this advantage is obtainable with the construction disclosed and not readily obtainable so far as I am aware with other constructions.

While I have shown and described my invention as embodied in the form which I at present consider best adapted to carry out its purposes, it will be understood that it is capable of some modification, and that I do not desire to be limited in the interpretation of the following claims except as may be necessitated by the state of the prior art.

What I claim is:—

1. In a pipe section designed to prevent the corrosive action of chemical fumes by preventing its sweating, the combination with the imperforate casing composed of a material susceptible to the action of fumes, of an imperforate tubular lining of a chemical resisting material, the external diameter of the lining being less than the internal diameter of the casing so as to provide a heat insulating dead air space between the casing and the lining, and means to maintain a spaced relation between the casing and the lining.

2. In a pipe section designed to prevent the corrosive action of chemical fumes by preventing its sweating, the combination with the imperforate casing composed of a material susceptible to the action of fumes, of an imperforate tubular lining of a chemical resisting material, the external diameter of the lining being less than the internal diameter of the casing so as to provide a heat insulating dead air space between the casing and the lining, and means to maintain a spaced relation between the casing and the lining, said means consisting of a helix with widely spaced spirals interposed between them.

EDWARD W. KAISER.